(12) United States Patent
Yee et al.

(10) Patent No.: US 12,436,560 B2
(45) Date of Patent: Oct. 7, 2025

(54) ELECTRONIC DEVICE WITH TORQUE-OPTIONAL HINGE

(71) Applicant: Microsoft Technology Licensing, LLC, Redmond, WA (US)

(72) Inventors: Christina Ashley Yee, Redmond, WA (US); Brian David Bitz, Woodinville, WA (US); Beau Squire, Redmond, WA (US); Ryan Behn, Redmond, WA (US); Michael Gordon Oldani, Redmond, WA (US); Anthony E. Hillyerd, Sammamish, WA (US); Joseph Benjamin Gault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 17/790,914

(22) PCT Filed: Jun. 28, 2020

(86) PCT No.: PCT/US2020/040030
§ 371 (c)(1),
(2) Date: Jul. 5, 2022

(87) PCT Pub. No.: WO2021/141625
PCT Pub. Date: Jul. 15, 2021

(65) Prior Publication Data
US 2023/0084038 A1 Mar. 16, 2023

Related U.S. Application Data

(60) Provisional application No. 62/957,639, filed on Jan. 6, 2020.

(51) Int. Cl.
*G06F 1/16* (2006.01)

(52) U.S. Cl.
CPC ............ *G06F 1/162* (2013.01); *G06F 1/1681* (2013.01)

(58) Field of Classification Search
CPC ....... G06F 1/162; G06F 1/1681; G06F 1/1616
See application file for complete search history.

(56) References Cited

U.S. PATENT DOCUMENTS

| | | |
|---|---|---|
| 5,489,924 A | 2/1996 | Shima |
| 5,564,163 A | 10/1996 | Lowry et al. |

(Continued)

FOREIGN PATENT DOCUMENTS

| | | |
|---|---|---|
| CN | 201301889 Y | 9/2009 |
| CN | 101672322 A | 3/2010 |

(Continued)

OTHER PUBLICATIONS

Non-Final Office Action mailed on Aug. 28, 2024, in U.S. Appl. No. 17/793,624, 12 pages.

(Continued)

*Primary Examiner* — Imani N Hayman
*Assistant Examiner* — Theron S Milliser
(74) *Attorney, Agent, or Firm* — Ray Quinney & Nebeker P.C.; Paul N. Taylor

(57) ABSTRACT

An electronic device includes a first portion, a second portion, and a third portion. A torque-optional hinge connects the third portion to the second portion, and a support hinge connects the third portion to the first portion. The torque-optional hinge has a hinge axis and a means for selectively generating a torque around the hinge axis. The means for selectively generating the torque has a high-torque state and a low-torque state. The high-torque state provides a greater rotational resistance around the hinge axis (Continued)

than the low-torque state. The support hinge rotatably connects the first portion and the third portion and provides a torque around a support axis.

20 Claims, 9 Drawing Sheets

(56) References Cited

U.S. PATENT DOCUMENTS

| | | | |
|---|---|---|---|
| 5,644,469 A | 7/1997 | Shioya | |
| 6,266,236 B1 | 7/2001 | Ku et al. | |
| 6,464,195 B1* | 10/2002 | Hildebrandt | G06F 1/1683 |
| | | | 248/920 |
| 6,826,043 B2 | 11/2004 | Chang | |
| 7,061,753 B2 | 6/2006 | Michoux | |
| 7,403,378 B2 | 7/2008 | Lo et al. | |
| 7,478,786 B2 | 1/2009 | Copeland | |
| 7,742,285 B2 | 6/2010 | Ishikura | |
| 8,074,323 B2 | 12/2011 | Lin | |
| 8,253,648 B2 | 8/2012 | Nagai | |
| 8,908,364 B2 | 12/2014 | Tseng et al. | |
| 8,914,946 B2* | 12/2014 | Hsu | G06F 1/1681 |
| | | | 16/342 |
| 9,261,906 B2 | 2/2016 | Arima | |
| 9,291,299 B2 | 3/2016 | Richard | |
| 9,523,226 B1 | 12/2016 | Lam et al. | |
| 9,644,412 B2* | 5/2017 | Novin | E05D 11/082 |
| 9,791,674 B1 | 10/2017 | Topliss | |
| 9,927,844 B2 | 3/2018 | Park | |
| 10,025,348 B2 | 7/2018 | Arima | |
| 10,061,360 B1 | 8/2018 | Magi et al. | |
| 10,151,128 B2* | 12/2018 | Hatano | G06F 1/1681 |
| 10,324,501 B1* | 6/2019 | Zimmerman | G06F 1/1681 |
| 10,407,957 B1* | 9/2019 | Camp | F16D 27/105 |
| 10,558,245 B2* | 2/2020 | Morrison | G06F 1/1649 |
| 10,648,212 B2* | 5/2020 | Novin | G06F 1/1681 |
| 10,761,571 B1 | 9/2020 | Cooper | |
| 10,852,765 B2* | 12/2020 | Sanchez | G06F 1/1618 |
| 10,996,710 B2 | 5/2021 | Park | |
| 11,008,789 B2* | 5/2021 | Hatano | E05D 3/12 |
| 11,106,249 B1* | 8/2021 | Zimmerman | G06F 1/1681 |
| 11,237,643 B2 | 2/2022 | Kulkarni | |
| 11,507,145 B2* | 11/2022 | Nakamura | E05F 1/1207 |
| 2004/0021051 A1 | 2/2004 | Chiu | |
| 2005/0138775 A1 | 6/2005 | Oakley | |
| 2006/0211457 A1 | 9/2006 | Otsuka | |
| 2006/0288258 A1 | 12/2006 | Lo | |
| 2007/0058329 A1 | 3/2007 | Ledbetter | |
| 2007/0183123 A1 | 8/2007 | Chuan | |
| 2008/0094792 A1 | 4/2008 | Chen | |
| 2008/0271288 A1 | 11/2008 | Senatori | |
| 2011/0312392 A1 | 12/2011 | Reeves et al. | |
| 2012/0124775 A1* | 5/2012 | Ceci | G06F 1/1681 |
| | | | 16/342 |
| 2013/0160244 A1 | 6/2013 | Sayama | |
| 2013/0318746 A1 | 12/2013 | Kuramochi | |
| 2014/0157546 A1 | 6/2014 | Ho et al. | |
| 2014/0165334 A1 | 6/2014 | Liu | |
| 2014/0338483 A1* | 11/2014 | Hsu | H04M 1/022 |
| | | | 74/96 |
| 2014/0375194 A1 | 12/2014 | Arima | |
| 2014/0375196 A1 | 12/2014 | Nguyen | |
| 2015/0002998 A1 | 1/2015 | Arima | |
| 2015/0077915 A1 | 3/2015 | Saito | |
| 2015/0121654 A1* | 5/2015 | Novin | E05D 3/02 |
| | | | 16/273 |
| 2015/0185786 A1 | 7/2015 | Yeh et al. | |
| 2016/0147267 A1 | 5/2016 | Bitz et al. | |
| 2016/0327994 A1 | 11/2016 | Lee | |
| 2017/0097657 A1 | 4/2017 | Hampton et al. | |
| 2017/0208703 A1 | 7/2017 | Lin | |
| 2017/0218672 A1* | 8/2017 | Novin | E05D 3/02 |
| 2018/0044958 A1 | 2/2018 | Tazbaz et al. | |
| 2018/0066465 A1 | 3/2018 | Tazbaz et al. | |
| 2018/0088634 A1 | 3/2018 | Bitz | |
| 2018/0112447 A1* | 4/2018 | Hatano | G06F 1/1681 |
| 2018/0188781 A1 | 7/2018 | Park, Jr. | |
| 2018/0209473 A1 | 7/2018 | Park et al. | |
| 2019/0011957 A1 | 1/2019 | Wendt | |
| 2019/0029135 A1 | 1/2019 | Park et al. | |
| 2019/0064886 A1 | 2/2019 | Wendt | |
| 2019/0243426 A1* | 8/2019 | Morrison | G06F 1/1681 |
| 2020/0040626 A1* | 2/2020 | Hatano | F16C 11/10 |
| 2020/0233459 A1* | 7/2020 | Sanchez | G06F 1/1677 |
| 2021/0289644 A1 | 9/2021 | Zarnowitz | |
| 2022/0057844 A1* | 2/2022 | Nakamura | G06F 1/1681 |
| 2023/0034612 A1 | 2/2023 | Hillyerd et al. | |
| 2023/0049295 A1 | 2/2023 | Hillyerd | |
| 2023/0049811 A1* | 2/2023 | Krahn | G06F 1/1616 |
| 2023/0123520 A1 | 4/2023 | Yee et al. | |
| 2023/0129909 A1 | 4/2023 | Yee et al. | |
| 2024/0111330 A1 | 4/2024 | Yu | |
| 2024/0111339 A1 | 4/2024 | Sun | |

FOREIGN PATENT DOCUMENTS

| | | |
|---|---|---|
| CN | 102572029 A | 7/2012 |
| CN | 103291163 A | 9/2013 |
| CN | 103576772 A | 2/2014 |
| CN | 104765412 A | 7/2015 |
| CN | 104767843 A | 7/2015 |
| CN | 204553526 U | 8/2015 |
| CN | 107771308 A | 3/2018 |
| CN | 109564449 A | 4/2019 |
| CN | 109643144 A | 4/2019 |
| CN | 110168470 A | 8/2019 |
| CN | 110226149 A | 9/2019 |
| CN | 108691470 A | 9/2021 |
| EP | 2397929 A1 | 12/2011 |
| EP | 2557473 A1 | 2/2013 |
| EP | 2615331 A1 | 7/2013 |
| EP | 2696255 A2 | 2/2014 |
| EP | 2911030 A2 | 8/2015 |
| EP | 3069208 A1 | 9/2016 |
| GB | 931284 A | 7/1963 |
| WO | 2010015931 A2 | 2/2010 |

OTHER PUBLICATIONS

Office Action Received for Chinese Application No. 202080092254.4, mailed on Dec. 11, 2023, 11 pages (English Translation Provided).

Office Action received for Chinese Application No. 202080092255.9, mailed on Dec. 1, 2023, 16 Pages (English Translation Provided).

Office Action Received for Chinese Application No. 202080093593.4, mailed on Dec. 28, 2023, 11 pages.

Communication pursuant to Article 94(3) EPC, Received for European Application No. 20720607.9, mailed on Jul. 5, 2024, 8 pages.

Communication under Rule 71(3) received in European Application No. 20719884.7, mailed on Jun. 18, 2024, 8 pages.

Second Office Action Received for Chinese Application No. 202080092255.9, mailed on May 23, 2024, 11 pages. (English Translation Provided).

"International Search Report and Written Opinion Issued in PCT Application No. PCT/US20/014025", Mailed Date: Oct. 9, 2020, 14 Pages.

"International Search Report and Written Opinion Issued in PCT Application No. PCT/US20/024692", Mailed Date: Dec. 11, 2020, 15 Pages.

"International Search Report and Written Opinion Issued in PCT Application No. PCT/US20/024700", Mailed Date: Nov. 23, 2020, 12 Pages.

"International Search Report and Written Opinion Issued in PCT Application No. PCT/US20/040030", Mailed Date: Oct. 9, 2020, 13 Pages.

"International Search Report and Written Opinion Issued in PCT Application No. PCT/US20/040031", Mailed Date: Dec. 2, 2020, 17 Pages.

(56) References Cited

OTHER PUBLICATIONS

"Invitation To Pay Additional Fees Issued in PCT Application No. PCT/US20/040031", Mailed Date: Oct. 7, 2020, 10 Pages.
U.S. Appl. No. 17/793,624, filed Jul. 18, 2022.
U.S. Appl. No. 17/790,926, filed Jul. 5, 2022.
U.S. Appl. No. 17/914,684, filed Sep. 26, 2022.
U.S. Appl. No. 17/914,640, filed Sep. 26, 2022.
First Office Action Received for Chinese Application No. 202080099087.6, mailed on Aug. 17, 2024, 17 pages (English Translation Provided).
Non-Final Office Action mailed on Aug. 27, 2024, in U.S. Appl. No. 17/790,926, 9 pages.
Communication pursuant to Article 94(3) Received in European Patent Application No. 20743462.2, mailed on Dec. 10, 2024, 5 pages.
Non-Final Office Action mailed on Dec. 11, 2024, in U.S. Appl. No. 17/914,684, 10 pages.
Office Action Received for Chinese Application No. 202080092254.4, mailed on Aug. 29, 2024, 9 pages. (English Translation Provided).
Office Action Received for Chinese Application No. 202080099092.7, mailed on Nov. 21, 2024, 15 Pages (English Translation Provided).
Communication pursuant to Article 94(3) Received in European Patent Application No. 20743461.4, mailed on Jan. 16, 2025, 8 pages.
Communication under Rule 71(3) EPC Received for European Application No. 20707880.9, mailed on Mar. 5, 2025, 08 pages.
Decision on Rejection Received for Chinese Application No. 202080092255.9, mailed on Jan. 13, 2025, 8 pages (English Translation Provided).
Decision to Grant pursuant to Article 97(1) Received for European Application No. 20719884.7, mailed on Oct. 24, 2024, 02 pages.
Final Office Action mailed on Mar. 13, 2025, in U.S. Appl. No. 17/790,926, 8 pages.
Final Office Action mailed on Mar. 25, 2025, in U.S. Appl. No. 17/793,624, 10 pages.
Notice of grant Received for Chinese Application No. 202080093593.4, mailed on May 10, 2024, 4 pages.
Notice of Grant Received for Chinese Application No. 202080099087.6, mailed on Feb. 8, 2025, 9 pages (English Translation Provided).
Final Office Action mailed on Apr. 14, 2025, in U.S. Appl. No. 17/914,684, 11 pages.
Examination report Received for Indian Application No. 202247046431, mailed on Jun. 2, 2025, 7 pages.
Second Office Action Received for Chinese Application No. 202080099092.7, mailed on May 16, 2025, 15 Pages (English Translation Provided).
Communication Under Rule 71(3) EPC, Received in European Patent Application No. 20743462.2, mailed on May 14, 2025, 08 pages.
Decision to Grant pursuant to Article 97(1) received in European Application No. 20707880.9, mailed on Jul. 3, 2025, 2 pages.
Non-Final Office Action mailed on Jul. 2, 2025, in U.S. Appl. No. 17/793,624, 14 pages.
Non-Final Office Action mailed on Jul. 22, 2025, in U.S. Appl. No. 17/790,926, 17 pages.
Non-Final Office Action mailed on Jun. 26, 2025 in U.S. Appl. No. 17/914,640, 13 pages.

* cited by examiner

ELECTRONIC DEVICE WITH TORQUE-OPTIONAL HINGE

CROSS-REFERENCE TO RELATED APPLCIATIONS

This application claims priority to and the benefit of U.S. Provisional Patent Application No. 62/957,639, filed on Jan. 6, 2020, which is hereby incorporated by reference in its entirety.

BACKGROUND

Background and Relevant Art

Wireless electronic devices provide users improved levels of freedom while remaining connected to personal and professional communications. Conventional folding laptop devices support a display with a base portion containing a keyboard. The form factor requires a base to support the display and limits the options for positions and postures of an electronic device.

BRIEF SUMMARY

In some embodiments, an electronic device has a plurality of postures attainable by selectively supporting a display of the device with different hinges. The hinges provide different amounts of friction to support the display during use or transition in the different postures.

In some embodiments, an electronic device includes a first portion, a second portion, and a third portion. A torque-optional hinge connects the third portion to the second portion, and a support hinge connects the third portion to the first portion. The torque-optional hinge has a hinge axis and a means for selectively generating a torque around the hinge axis. The means for selectively generating the torque has a high-torque state and a low-torque state. The high-torque state provides a greater rotational resistance around the hinge axis than the low-torque state. The support hinge rotatably connects the first portion and the third portion and provides a torque around a support axis.

In some embodiments, an electronic device includes a first portion, a second portion, and a third portion. A torque-optional hinge connects the third portion to the second portion, and a support hinge connects the third portion to the first portion. The torque-optional hinge has a hinge axis and a torque element with a ratcheting mechanism configured to selectively generate a torque around the hinge axis. The torque-optional hinge has a high-torque state and a low-torque state. The high-torque state provides a rotational resistance around the hinge axis and the low-torque state allows rotation around the hinge axis without additional rotational resistance. The support hinge rotatably connects the first portion and the third portion and provides a torque around a support axis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a side view of the electronic device of FIG. 1 in a drafting position, according to some embodiments of the present disclosure;

FIG. 1-3 is a side view of the electronic device of FIG. 1 in a tablet position, according to some embodiments of the present disclosure;

FIG. 1-4 is a side view of the electronic device of FIG. 1 in a closed position, according to some embodiments of the present disclosure;

FIG. 2 is a side view of another electronic device with a torque-optional hinge, according to some embodiments of the present disclosure;

FIG. 3 is a perspective view of a torque-optional hinge disengaged, according to some embodiments of the present disclosure;

FIG. 4 is a side view of an electronic device with a support hinge having a torque element therein, according to some embodiments of the present disclosure;

FIG. 11-1 is a perspective view of a torque-optional hinge, according to some embodiments of the present disclosure;

FIG. 11-2 is a side cross-sectional view of the torque-optional hinge of FIG. 11-1, according to some embodiments of the present disclosure;

DETAILED DESCRIPTION

The present disclosure relates generally to systems and methods for supporting an electronic device. More particularly, the present disclosure relates to supporting a foldable electronic device in a plurality of postures and on a variety of surfaces. In some embodiments, the foldable device has a closed position and an open position. In conventional laptop devices, the display is supported in the open posture by the base portion of the laptop device and a torque provided by a hinge between the display cover and the base portion.

In some embodiments, a display cover and/or display of the electronic device is movable toward the user and/or positionable over a portion of the base of the electronic device. Moving the display cover over the base of the electronic device provides a closer display for viewing and/or a more stable platform for drafting or other interactions with a touch-sensitive display.

In some embodiments, a hinge connects the base portion to the display cover portion. The hinge is a torque-optional hinge that provides resistance to rotation between the display cover and the base portion to support the display and/or display cover. In some embodiments, the hinge disengages a torque element of the hinge when the display is rotated about a second hinge of the display cover.

In some embodiments, a display of the electronic device is supported by a first portion of the electronic device and the base portion is a second portion of the electronic device. The first portion is connected to the second portion through a third portion of the electronic device. The third portion is intermediate to the first portion and the second portion. In some embodiments, the third portion is connected to the second portion by a torque-optional hinge and connected to the first portion by a support hinge. In some embodiments, when the support hinge in a closed state, the torque-optional hinge is engaged and provides rotational friction. In some embodiments, when the support hinge is in an open state (e.g., the first portion is rotated away from the third portion), the torque-optional hinge is disengaged and provides less or no rotational friction.

Figure 1:
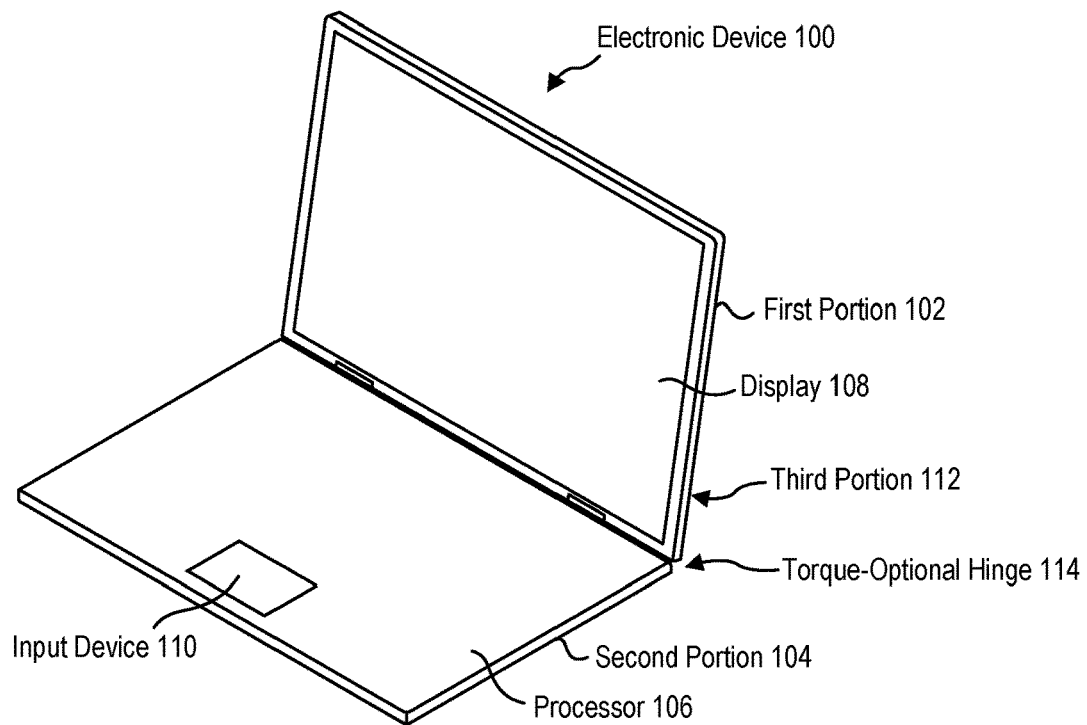
FIG. 1-1 is a perspective view of an electronic device in an open position, according to some embodiments of the present disclosure.

Referring now to FIG. 1-1, the electronic device 100 includes a first portion 102 and a second portion 104. In some embodiments, a processor 106 is located in the second portion 104 and a display 108 is located in the first portion 102. The processor 106 is in data communication with the display 108, input devices 110, and other electronic components, such as communication devices, hardware storage devices, power supplies, audio devices, thermal management devices, accessory interfaces, and other components.

Figures 1, 2:
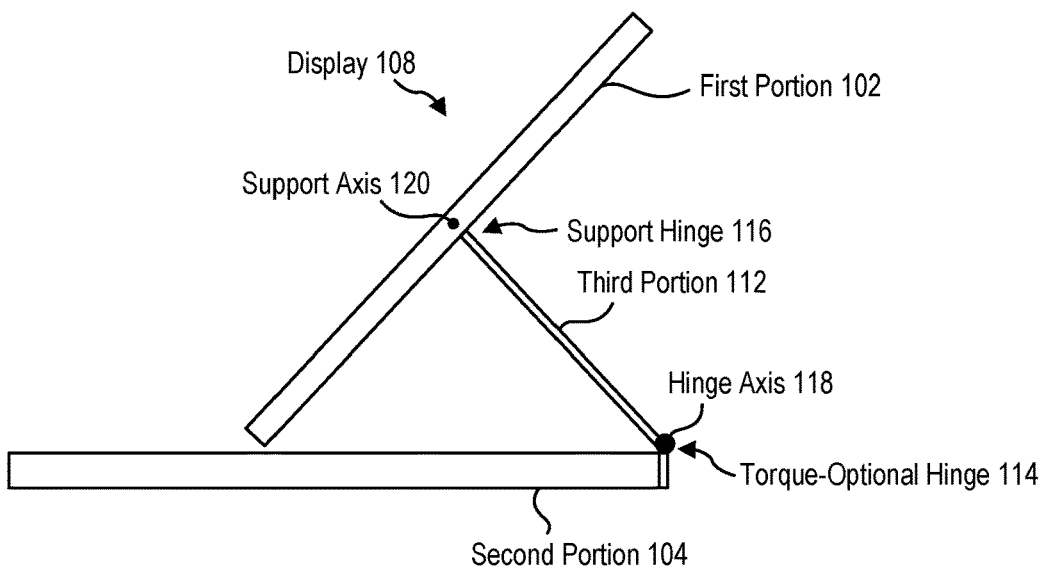

In some embodiments, a third portion 112 connects the first portion 102 to the second portion 104 through a pair of rotational connections. In some embodiments, the third portion 112 is connected to the second portion 104 by a torque-optional hinge 114. In some embodiments, the third portion 112 is connected to the first portion 102 by a support hinge 116, as shown in FIG. 1-2.

In some embodiments, the torque-optional hinge 114 is rotatable around a hinge axis 118. In some embodiments, the support hinge 116 is rotatable around a support axis 120 that is parallel to the hinge axis 118. In combination, rotation of the third portion 112 around the hinge axis 118 and rotation of the first portion 102 around the support axis 120 allows the display 108 to be positioned at a variety of orientations on and/or above the second portion 104.

In some embodiments, the support hinge 116 provides friction to support the first portion 102 with the third portion 112 and the combined friction of an engaged torque-optional hinge 114 and the support hinge 116 provides a large amount of resistance that is unpleasant for the user when adjusting the position of the first portion 102 and/or display 108. Additionally, while the torque-optional hinge 114 between the second portion 104 and third portion 106 supports the mass of the display 108 and other electronic components when the support hinge 116 is in a closed state, in some embodiments, when the support hinge 116 is in an open state, the first portion 102 and third portion 112 form a support structure that supports the mass of the display 108 and other electronic components of the first portion 102 independently of the torque-optional hinge 114.

In some embodiments, a foldable electronic device according to the present disclosure has an open position and a closed position in which the first portion and third portion are adjacent one another and a support hinge is in a closed state. A third portion and a second portion of the electronic device are movable relative to one another around a torque-optional hinge. In some embodiments, the torque-optional hinge is a single-axis hinge. In other embodiments, the torque-optional hinge is a multiple-axis hinge. For example, the torque-optional hinge may have two or more parallel axes that each allow rotation of the first portion relative to the second portion.

The rotation of the first axis and the second axis may be independent of one another. In some examples, the rotation of the first axis and the second axis may be related. In some embodiments, the first axis and second axis rotate at the same rate, such that each axis is oriented at an equal angular position at point in the range of motion of the hinge. In some embodiments, the first axis and second axis rotate with determinate motion, allowing only one axis to move at a time.

In the closed position, an inner surface of the first portion and an inner surface of the second portion are oriented toward one another. For example, an electronic device with a display in the first portion and one or more input devices in the second portion has the display facing and adjacent to the input devices in the closed position. In some embodiments, the display is a touch-sensitive display. In some embodiments, the input device is a touch-sensitive display. In at least one example, a touch-sensitive display of the second portion and a touch-sensitive display of the first portion are facing and adjacent to one another in the closed position.

In some embodiments, the electronic device has a first display on an inner surface of the first portion and a second display on an inner surface of the second portion. In some embodiments, the electronic device in the open position orients the first portion and the second portion at 180° relative to one another and positions the first display and the second display co-planar to one another. In this position, the first display and second display may be in data communication (e.g., through a processor and/or graphics module)

that allows the first display and second display to present visual information to a user as if the first display and second display are a single, unified display area.

Figures 1, 2, 3:
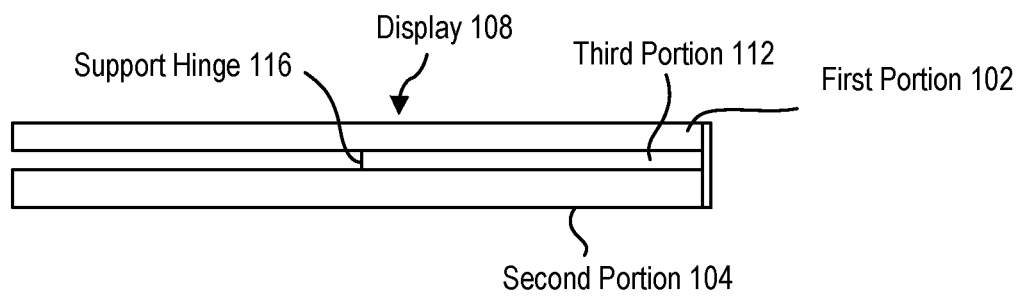

In some embodiments, the electronic device has a plurality of postures that are made possible by the connection of the first portion to the second portion by two hinges on either end of an intermediate third portion of the electronic device. When the support hinge remains in a closed state, the torque-optional hinge between the second portion and the third portion allows the electronic device to operate similar to a conventional laptop moving between an open position and a closed position, such as shown in the embodiment illustrated in FIG. 1-1. When the support hinge 116 is in an open state and the first portion 102 and third portion 112 are rotated away from one another, the electronic device enters a drafting position, such as illustrated in FIG. 1-2. In some embodiments, the support hinge 116 has a range of motion (e.g., up to 180°) that allows the first portion 102 to invert on the third portion 112 and second portion 104 with the display 108 oriented outward, and the electronic device enters a tablet position, such as shown in FIG. 1-3. In some embodiments, when the support hinge 116 and the torque-optional hinge 114 are both closed, the electronic device is in a closed position, as shown in FIG. 1-4.

In some embodiments, the drafting position of the electronic device includes moving the support hinge to a position between 0° and 180°. When the support hinge opens, the first portion rotates away from the third portion. In some embodiments, a lower edge of the first portion proximate the torque-optional hinge moves away from the torque-optional hinge and disengages the torque element of the torque-optional hinge. In some embodiments, after the support hinge opens, the first portion rotates away from the third portion, the hinge between the second portion and the third portion reduces in rotational resistance and/or provides no rotational resistance between the second portion and the third portion.

In some embodiments, the support hinge has a range of motion allowing the first portion to rotate up to 180° relative to the third portion. The first portion, therefore, may be parallel with the back surface of the third portion. In some embodiments, the third portion folds down to be parallel with the second portion, and the electronic device enters a tablet mode with the first portion oriented parallel with and stacked on top of the second portion. A display of the first portion is oriented away from the second portion in the tablet mode, allowing the user to view and/or interact with the display.

In some embodiments, the first and third portions are moved away from the second portion to provide clearance for the first portion to rotate around the support hinge relative to the third portion. When the support hinge returns to a closed state and the first portion and the third portion are contacting one another and parallel, the electronic device is in the open position. In some embodiments, the torque-optional hinge between the third portion and the second portion engages and a torque element of the torque-optional hinge provides rotational resistance around the hinge axis. From the open position, the electronic device can return to a closed position by rotating the first and third portions collectively relative to the second portion around the torque-optional hinge.

In some embodiments, the torque-optional hinge between the second portion (e.g., the base of the electronic device) and the third portion (e.g., the support that connects to and supports the first portion) has a high-torque state and a low-torque state. The high-torque state provides greater rotational resistance around a hinge axis of the torque-optional hinge than the low-torque state. In some embodiments, the low-torque state provides less than approximately 50% of the rotational resistance of the high-torque state. In some embodiments, the low-torque state provides less than approximately 25% of the rotational resistance of the high-torque state. In some embodiments, the low-torque state provides substantially no friction around the hinge axis.

In some embodiments, the high-torque state is an engaged state and the low-torque state is a disengaged state. In some embodiments, the torque-optional hinge receives a tab, pin, clip, clamp, post, or other engagement element from the first portion of the electronic device when a support hinge is in a closed state and the first portion and third portion are adjacent one another. For example, when the support hinge is in the closed state, a lower edge of the first portion is adjacent the torque-optional hinge, and an engagement element of the first portion engages with the torque-optional hinge, placing the torque-optional hinge in the high-torque state.

FIG. 2 is a side view of an electronic device 200 with a first portion 202 and third portion 212 adjacent one another with a closed support hinge. In some embodiments, when the first portion 202 is adjacent the third portion 212, the torque-optional hinge 214 is in a high-torque state around the hinge axis 218, and the electronic device 200 operates similar to a conventional laptop display cover and base. In some embodiments, when the first portion rotates around the support hinge and the lower edge moves away from the third portion and the torque-optional hinge, the engagement element of the first portion disengages from the torque-optional hinge and the torque-optional hinge enters the low-torque state. Referring now to FIG. 3, in some embodiments, the engagement element is a post 222 or other protrusion from the first portion 202 that engages with a recess 224 or other opening in the torque-optional hinge 214. In some embodiments, the recess 224 is located in a torque element 226, so that when the post 222 engages with the recess 224, the post 222 couples the rotation of the first portion 202 and third portion 212 around the hinge axis 218 to the rotation of a torque element 226.

Figures 1, 2, 3, 4:
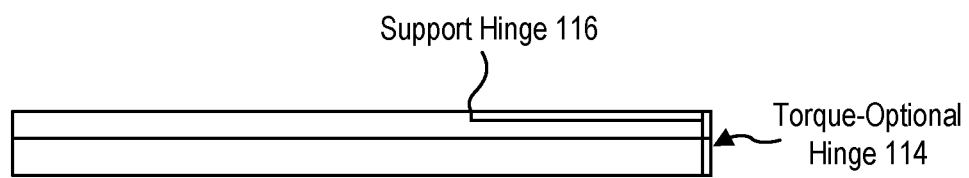
Figure 2:
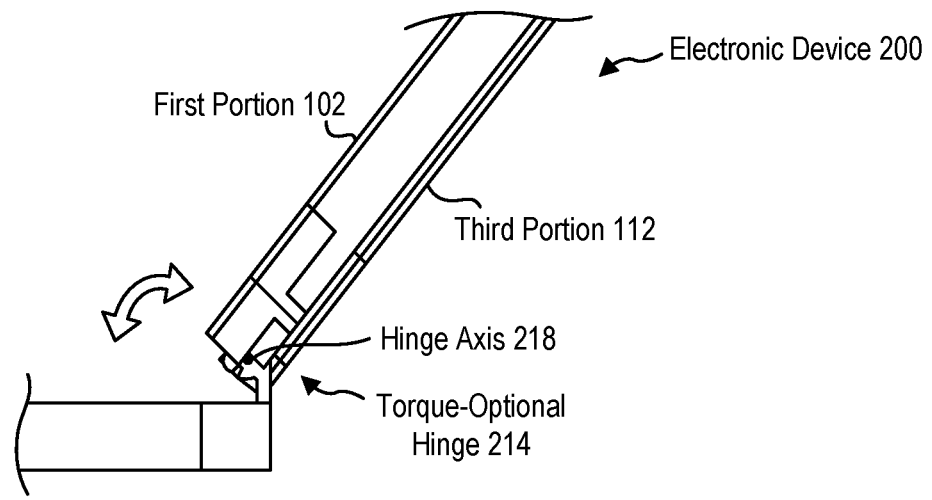
Figure 3:
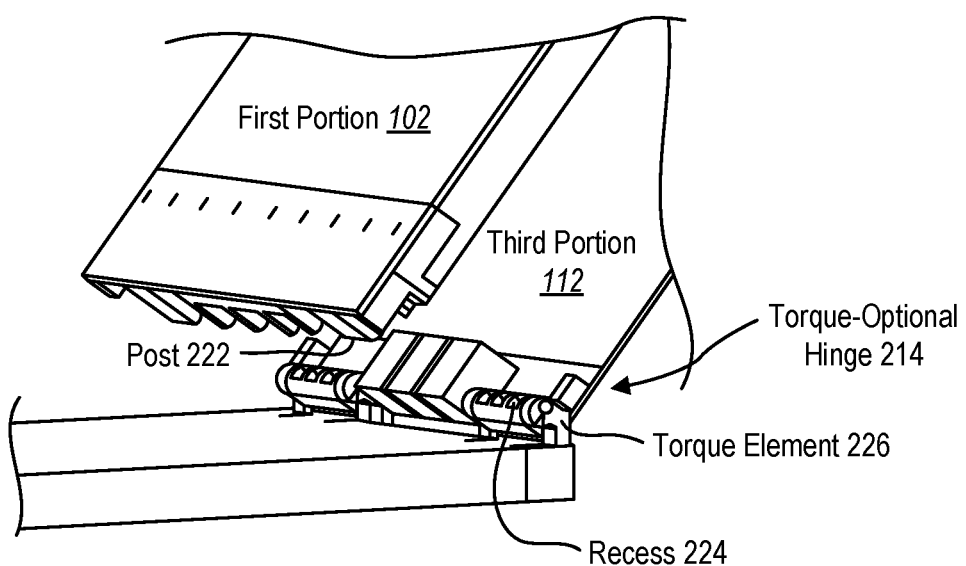
Figure 4:
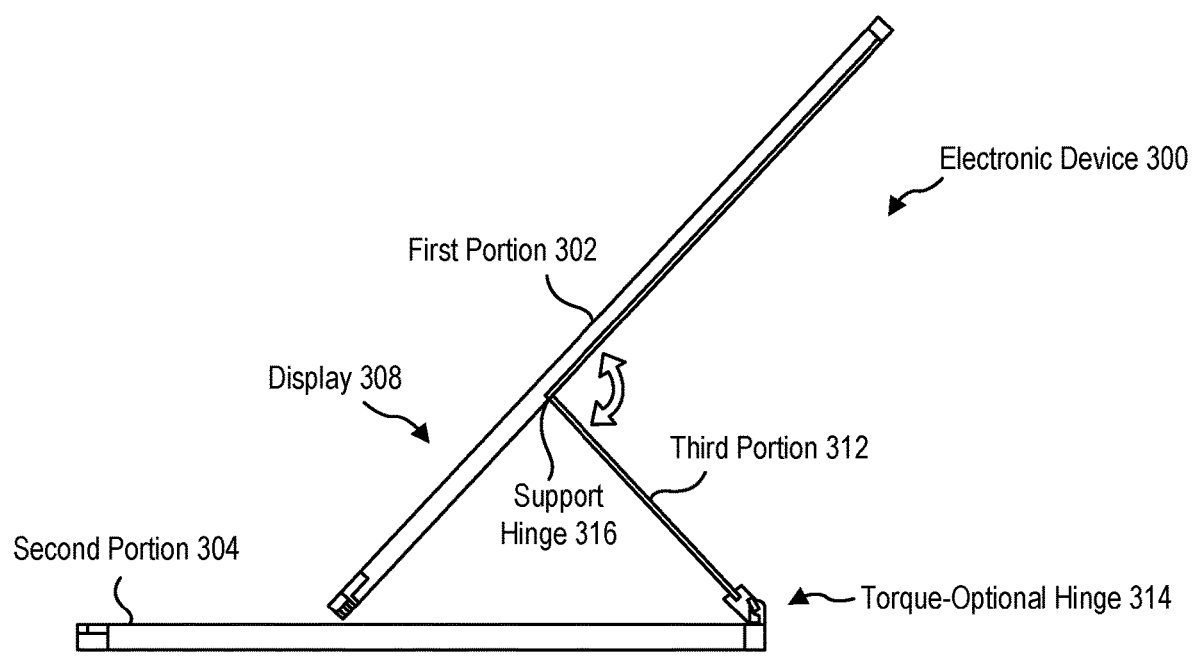

FIG. 4 illustrates an embodiment of an electronic device 300 with the torque optional hinge 314 in a low-torque state. In some embodiments, the first portion 302 and third portion 312 form a support structure atop the second portion 304 with the support hinge 316 to support the mass of the first portion 302, and electronic components therein, in a drafting position without relying on torque from the torque-optional hinge 314.

In some embodiments, the torque element generates a compression force in a radial direction around an axle of the hinge. In some embodiments, the torque element includes to axially adjacent elements that contact one another and generate a friction force as one element rotates relative to the other. In some embodiments, the torque element includes a fluid that provides resistance to the rotation of the torque element based on a viscosity of the fluid. In some embodiments, the torque element includes one or more magnets that resist rotation around the hinge axis via generation of eddy currents.

When the lower edge of the first portion rotates away from the torque-optional hinge, disengaging with the torque element, the torque-optional hinge enters into the low-torque state. In some embodiments, the low-torque state allows the third portion to rotate around the hinge axis with less or no rotational resistance.

In some embodiments, the support hinge rotationally connects the first portion to the third portion, and the torque generated by the support hinge supports the mass of the first portion at a drafting or viewing angle relative to the second portion. In some embodiments, the lower edge of the first portion rests on the second portion and the torque-optional hinge is connected to the second portion.

In some embodiments, when the first portion disconnects from the torque-optional hinge and the engagement elements disengage from torque-optional hinge, the third portion remains connected to the second portion via the torque-optional hinge. In some embodiments, the third portion remains connected to the second portion via an axle of the torque-optional hinge. In some embodiments, the third portion remains connected to the second portion via a flexible tether of the torque-optional hinge.

In some embodiments, the torque-optional hinge includes a frictional connection between the first portion and the second portion and a flexible connector between the third portion and the second portion. In some embodiments, the flexible connector is a polymer sheet or strap that is affixed to the second portion and the third portion. In some embodiments, the flexible connector is a fabric sheet or strap that is affixed to the second portion and the third portion. In some embodiments, the flexible connector is a leather sheet or strap that is affixed to the second portion and the third portion. In some embodiments, the flexible connector is a rubber sheet or strap that is affixed to the second portion and the third portion.

In some embodiments, a torque-optional hinge with a flexible connector between the third portion and the second portion includes a torque element that is selectively engaged by the first portion of the electronic device. In some embodiments, the torque is generated by a radial compression force between an axle and a clamp. In some embodiments, the axle is fixed relative to the second portion and the clamp is fixed relative to the first portion. In some embodiments, the clamp is fixed relative to the second portion and the axle is fixed relative to the first portion.

Figure 5:
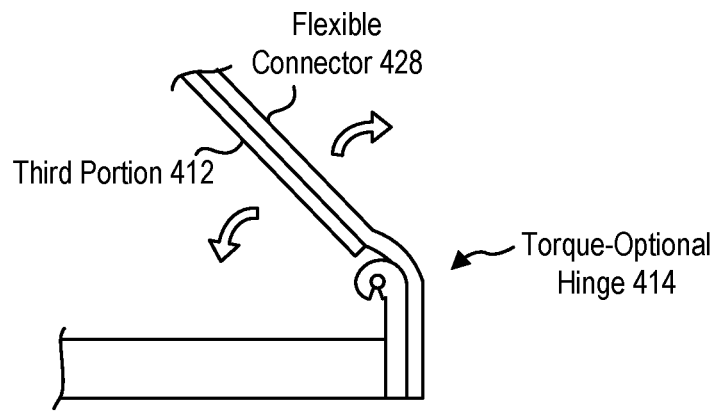
FIG. 5 is a side view of an electronic device with a tethered torque-optional hinge, according to some embodiments of the present disclosure.

FIG. 5 is a side view of a torque-optional hinge 414 with the first portion disengaged and the torque-optional hinge 414 in a low-torque state. The torque-optional hinge 414 includes a flexible connector 428 to retain the third portion 412 in connection with the torque-optional hinge 414.

Figure 6:
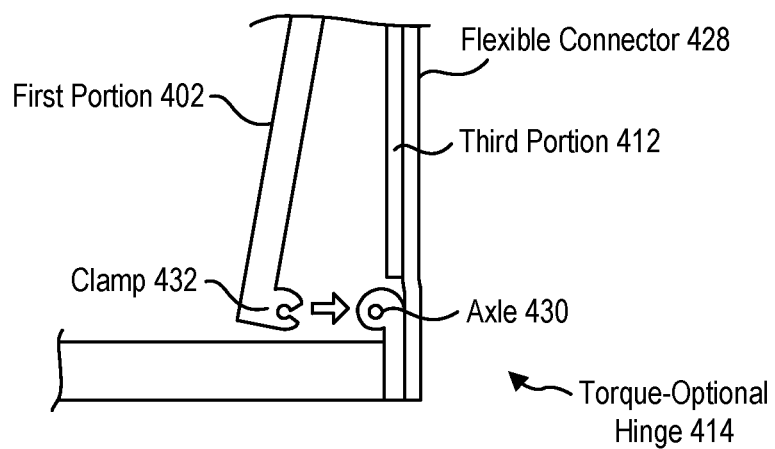
FIG. 6 is a side view of the electronic device of FIG. 5 illustrating engagement of a torque element, according to some embodiments of the present disclosure.

FIG. 6 is a side view of the torque-optional hinge 414 with the first portion 402 re-engaging the torque element with an axle 430 of the torque-optional hinge 414 engaged with a clamp 432 of the first portion 402. In some embodiments, the flexible connector 428 of the torque-optional hinge 414 helps align the axle 430 and clamp 432 to facilitate re-engagement.

In some embodiments, when the first portion 402 is parallel to and adjacent the third portion 412, the clamp 432 engages the axle 430. The engaged clamp 432 and axle 430 create a friction force between the clamp 432 and axle 430, functioning as the torque element when engaged.

In some embodiments, the flexible connector and the torque element are a shared component, such that the flexible connector provides different amounts of torque depending on the tension in the flexible connector. A portion of the flexible connector is wrapped around a bar or axle of the torque-optional hinge. In some embodiments, the first portion of the electronic device selectively contacts the flexible connector. When contacted by the first portion, the flexible connector experiences more tension and produces more compression on the bar or axle. When the first portion moves away from the flexible connector, the tension in the flexible connector is reduced and the compression on the bar or axle is reduced.

Figure 7:
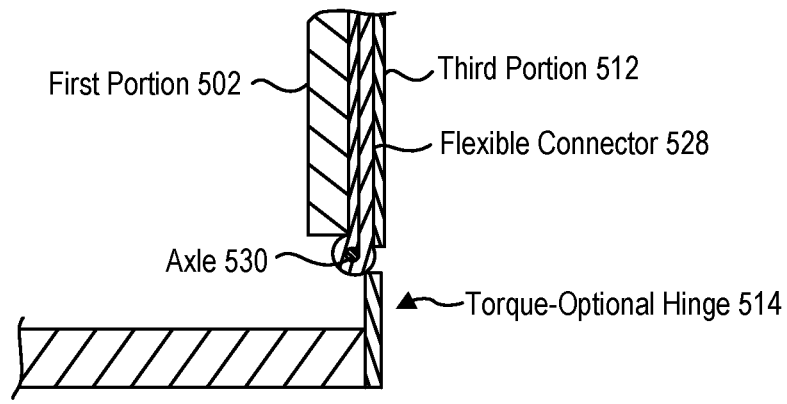
FIG. 7 is a side view of another electronic device with a tethered torque-optional hinge, according to some embodiments of the present disclosure.
Figure 8:
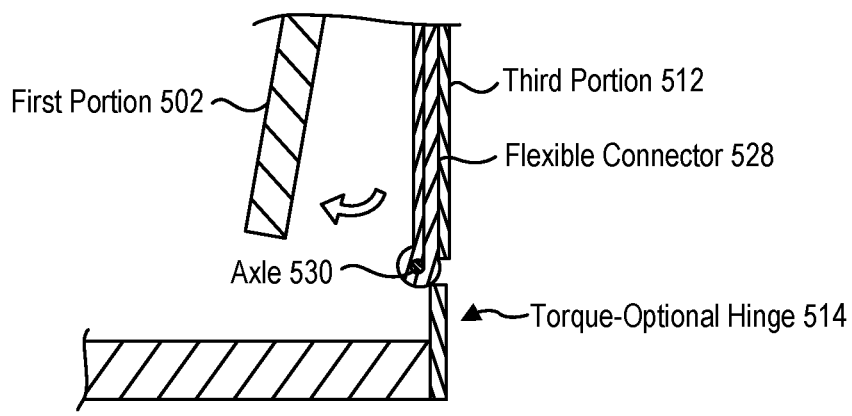
FIG. 8 is a side view of the electronic device of FIG. 7 illustrating disengagement of a torque element, according to some embodiments of the present disclosure.

FIG. 7 and FIG. 8 are side views of another embodiment of a torque-optional hinge 514. In some embodiments, the flexible connector 528 is wrapped around an axle 530 of the torque-optional hinge 514. The first portion 502 compresses the flexible connector 538, increasing the tension on the flexible connector 528 and increasing the friction between the flexible connector 528 and the axle 530. In some embodiments, when the first portion 502 is adjacent the third portion 512 and compressing the flexible connector 528, the torque-optional hinge 514 is in a high-torque state.

In some embodiments, when the first portion 502 moves away from the third portion 512 and the flexible connector 528, the torque-optional hinge 514 enters a low-torque state. The first portion 502 releases tension on the flexible connector 528 and the friction on the axle 530 reduces.

In some embodiments, the torque-optional hinge provides different amounts of torque in different rotational directions. In some embodiments, the torque-optional hinge is independently changeable between a high-torque state and a low-torque state in each rotational direction. In some embodiments, a torque-optional hinge is in a high-torque state in an opening rotational direction while being in a low-torque state in a closing rotational direction. In some embodiments, a torque-optional hinge is in a low-torque state in an opening rotational direction while being in a high-torque state in a closing rotational direction. In some embodiments, a torque-optional hinge changes from a high-torque state to a low-torque state in an opening rotational direction while remaining in a low-torque state in a closing rotational direction.

In some embodiments, the torque-optional hinge includes a ratcheting mechanism that provides rotational resistance in a first rotational direction with the pawl engaged with the ratchet gear and less or no rotational resistance in the second rotational direction. When the pawl is disengaged from the ratchet gear, the ratchet and pawl provide less or no rotational resistance in either the first rotational direction or the second rotational direction.

Figure 9:
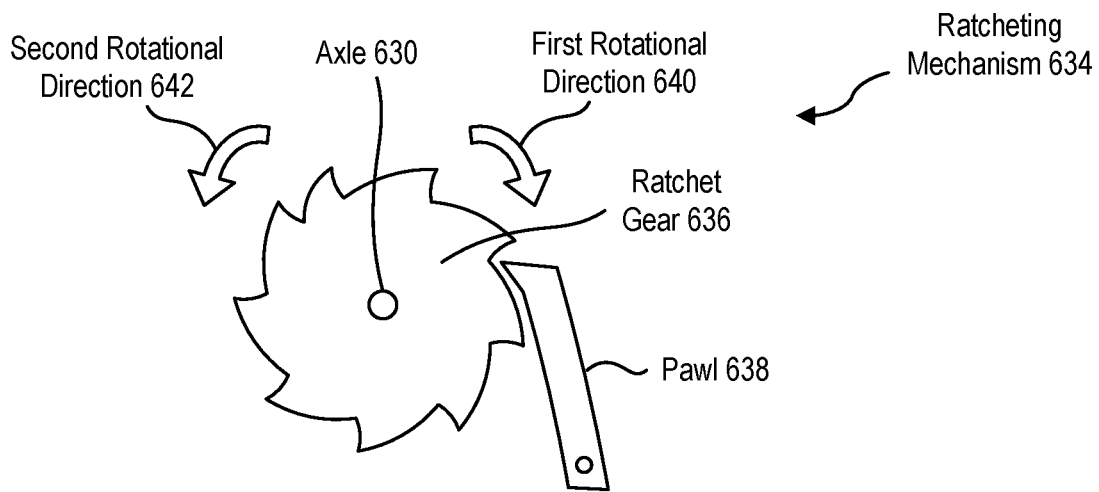
FIG. 9 is a perspective view of a ratcheting hinge that allows for selective torque engagement, according to some embodiments of the present disclosure.

FIG. 9 is a schematic view of an embodiment of a ratcheting mechanism 634 that includes a ratchet gear 636 positioned around an axle 630 of a torque-optional hinge. A pawl 638 of the ratcheting mechanism 634 selectively engages with the ratchet gear 636 to limit and/or prevent rotation of the ratchet gear 636 in the first rotational direction 640.

In some embodiments, the axle 630 rotates relative to the ratchet gear 636 with some amount of rotational resistance, therefore, the ratcheting mechanism allows the axle 630 to rotate in the first rotational direction 640 in a high-torque state when the pawl 638 is engaged and in the second rotational direction 642 in a low-torque state as the pawl 638 will not restrict rotation of the ratchet gear 636. When the pawl 638 is disengaged, in some embodiments, the axle 630 rotates freely in either rotational direction.

In some embodiments, the torque-optional hinge includes a pair of ratcheting mechanisms oriented in opposing rotational directions. Because the ratcheting mechanisms are each unidirectional, opposing ratcheting mechanisms allow independent selection of high-torque and low-torque states in each of the rotational directions.

Figure 10:
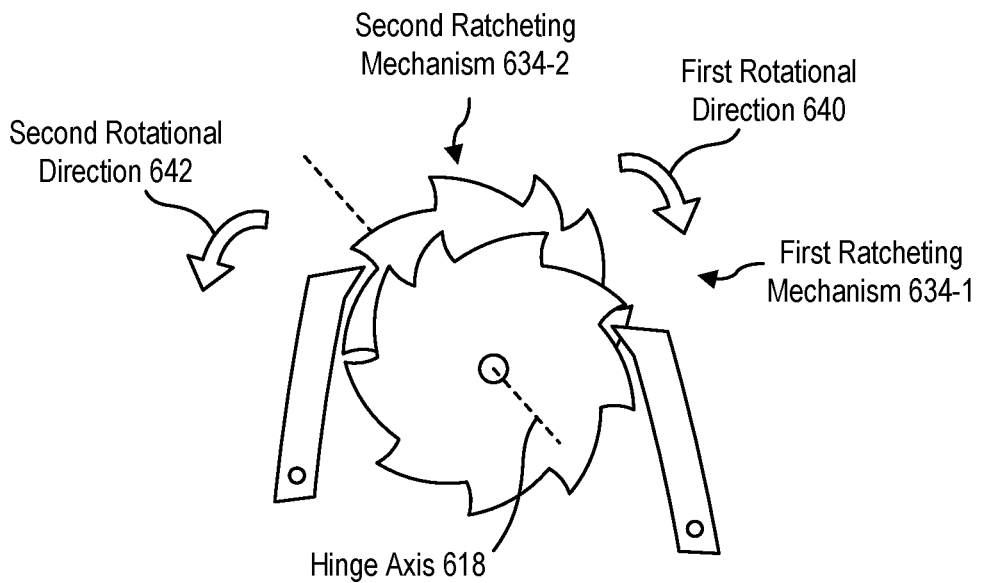
FIG. 10 is a perspective view of a ratcheting hinge with opposing ratcheting mechanisms that allows for selective torque engagement, according to some embodiments of the present disclosure.

FIG. 10 is a schematic representation of a first ratcheting mechanism 634-1 and a second ratcheting mechanism 634-2 oriented in opposing rotational directions 640, 642. In some embodiments, the first ratcheting mechanism 634-1 allows selective control over the high-torque and low-torque states in the first rotational direction 640, and the second ratcheting mechanism 634-2 allows selective control over the high-torque and low-torque states in the second rotational direction 642.

In some embodiments, the position of the pawl is controlled by the position of the first portion of the electronic device. In some embodiments, the lower edge or other part of the first portion contacts the pawl and urges the pawl toward the ratchet gear. In some embodiments, the pawl is moved toward the ratchet gear by a spring when the first portion is adjacent the third portion. In some embodiments, the pawl is moved by a pulley system connect to the support hinge, such that rotation of the support hinge translates to a cable pulling on the pawl. In some embodiments, the pawl is moved by an electromechanical actuator or motor that urges the pawl toward or away from the ratchet gear.

Figures 1, 11:
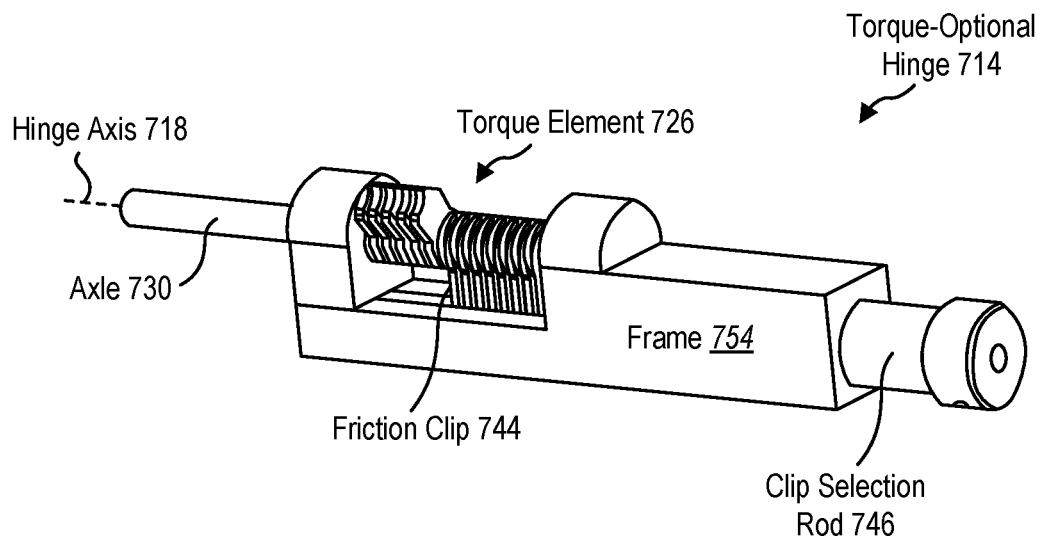
Figures 2, 11:
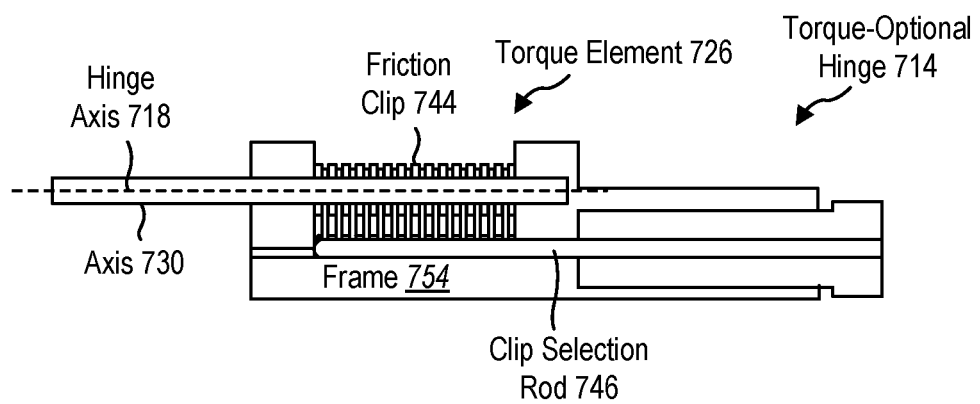

FIG. 11-1 is a perspective view of an embodiment of a torque-optional hinge 714 and FIG. 11-2 is a side cross-sectional view of the embodiment of a torque-optional hinge 714. While some embodiments of a torque-optional hinge according to the present disclosure are binary with a low-torque mode and a high-torque mode, other embodiments have a plurality of modes and/or are continuously variable with a range of available torque values between a lowest-torque mode and a highest-torque mode. In some embodiments, the torque-optional hinge 714 has a low-torque mode and a high-torque mode that are relative to one another.

In some embodiments, the torque element 726 of the torque-optional hinge 714 includes a plurality of friction clips 744 that each provide a torque to the axle 730 of the torque-optional hinge 714. The friction clips 744 engage a surface of the axle 730 and apply a compressive force and associated friction thereto. When a friction clip 744 is also engaged with a clip selection rod 746, the rotation of the friction clip 744 relative to the hinge axis 718 is limited and/or prevented and the friction with the axle 730 resists movement of the axle 730 relative to the frame 754, as well.

In some embodiments, when a friction clip 744 is engaged with a clip selection rod 746, the rotation of the axle 730 around the hinge axis 718 is, thereby, resisted by the friction due to the engaged friction clip(s) 744 contacting the axle 730. Conversely, a friction clip 744 that is not engaged with the clip selection rod 746 is free to rotate relative to a frame 754 of the torque-optional hinge 714, resulting in a rotational resistance (torque) of the torque-optional hinge 714 that is relative to the number of friction clips 744 that are both contacting the axle 730 and engaged with the clip selection rod 746. In some embodiments, a torque-optional hinge 714 with all friction clips 744 engaged with the clip selection rod 746 experiences a highest-torque mode. In some embodiments, a torque-optional hinge 714 with no friction clips 744 engaged with the clip selection rod 746 experiences a highest-torque mode. In some embodiments, the clip selection rod 746 remains engaged with at least one friction clip 744 in the lowest-torque mode. In some embodiments, additional torque values are selectable between the highest-torque mode and the lowest-torque mode.

A torque-optional hinge 714 with a plurality of friction clips 744, in some embodiments, have spacers or washers positioned between at least some of the friction clips 744 along the axle 730 to ensure that each friction clip 744 is engaged individually. Immediately adjacent and/or contacting friction clips 744 may impart additional and unintended friction or resistance to rotation upon one another. For example, a last friction clip 744 that is engaged by the clip selection rod 746 may, when no spacer is present therebetween, unintentionally contact and limit the rotation of an adjacent friction clip 744 that is not engaged by the clip selection rod 746, altering the effected torque from that which is selected by a user.

In some embodiments, the clip selection rod 746 is moveable relative to the frame 754 and friction clips 744 by a user manually inserting or retracting the clip selection rod 746 relative to the frame 754, such as by rotating a threaded clip selection rod 746. In some embodiments, the clip selection rod 746 is moveable relative to the frame 754 and friction clips 744 by an electric motor inserting or retracting the clip selection rod 746 relative to the frame 754. In some embodiments, the clip selection rod 746 is moveable relative to the frame 754 and friction clips 744 by a software controlled electric motor inserting or retracting the clip selection rod 746 relative to the frame 754, such as an operating system of an electronic device (e.g., electronic device 100 of FIG. 1). The torque generated by the torque-optional hinge 714, therefore, can be adjusted by the user or by the electronic device 100 itself based on a range of considerations.

Figure 12:
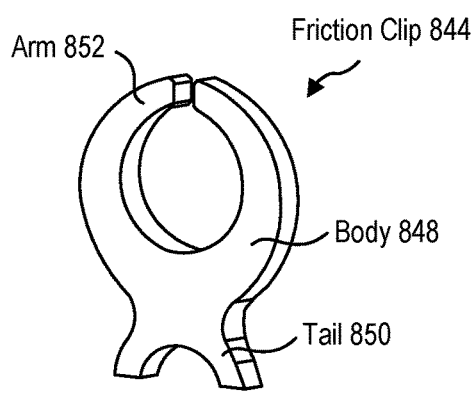
FIG. 12 is a perspective view of a friction clip, according to some embodiments of the present disclosure.

FIG. 12 is a perspective view of an embodiment of a friction clip 844, according to the present disclosure. In some embodiments, the friction clip 844 has a body 848 from which a plurality of arms 852 protrudes. In some embodiments, the arms 852 are elastically deformable to bend when an axle (e.g., axle 730 of FIGS. 11-1 and 11-2) is inserted between the arms 852. The arms 852 apply a compression force to the axle and an associated friction. When the friction clip 844 is rotated relative to the axle positioned between the arms 852, the friction applied to the axle surface resists the relative motion of the axle and the friction clip 844.

In some embodiments, a friction clip 844 has a tail 850 that protrudes from the body 848 in addition to the arms 852. In some embodiments, the tail 850 has a V-shape to engage with a rail or rod (e.g., clip selection rod 746 of FIGS. 11-1 and 11-2). In some embodiments, the tail 850 has a V-shape to engage with a rail or rod oriented perpendicularly to the direction of the tail 850. In some embodiments, the tail 850 includes a single protrusion from the body 848 that engages with a notch or other recess in a rail or rod (e.g., clip selection rod 746 of FIGS. 11-1 and 11-2).

Figure 13:
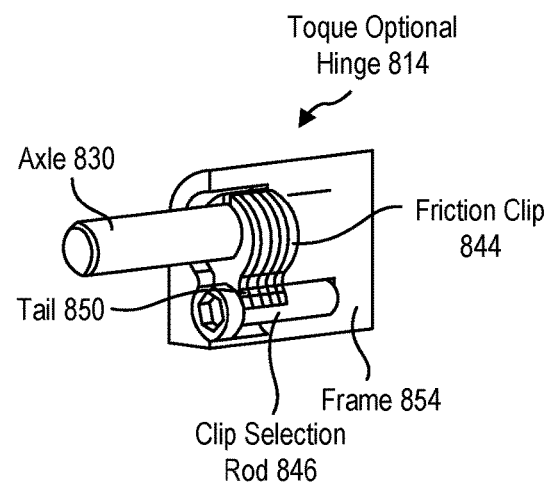
FIG. 13 is a partial cross-sectional perspective view of a torque-optional hinge, according to some embodiments of the present disclosure.

FIG. 13 is a partial cross-sectional perspective view of an embodiment of a torque-optional hinge 814. A torque-optional hinge 814 may have a plurality of friction clips 844 that are connected to and engaged with an axle 830 of the torque-optional hinge 814. The friction clips 844 each have a tail 850 that engages with a clip selection rod 846 that, depending upon the position of the clip selection rod 846, allows for the selective engagement with any number of the friction clips 844. The clip selection rod 846 is movable relative to a frame 854 to anchor the tail 850 of an engaged friction clip 844 relative to the frame 854 and limit rotation of the friction clip 844 as the axle 830 rotates relative to the frame 854.

Figure 14:
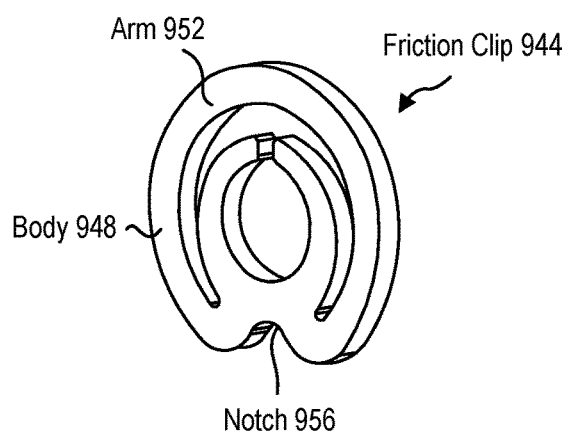
FIG. 14 is a perspective view of another friction clip, according to some embodiments of the present disclosure.

FIG. 14 is a perspective view of another embodiment of a friction clip 944, according to the present disclosure. In some embodiments, the friction clip 944 has a body 948 from which a plurality of arms 952 protrudes. In some embodiments, the arms 952 are elastically deformable to bend when an axle (e.g., axle 730 of FIGS. 11-1 and 11-2) is inserted between the arms 952. The arms 952 apply a compression force to the axle and an associated friction. When the friction clip 944 is rotated relative to the axle positioned between the arms 952, the friction applied to the axle surface resists the relative motion of the axle and the friction clip 944.

In some embodiments, a friction clip 944 has a notch 956 formed in an outer perimeter of the body 948 in addition to the arms 952. In some embodiments, the notch 956 engages with a protrusion of the frame of the torque-optional hinge to anchor the rotational position of the friction clip 944 relative to the frame.

Figure 15:
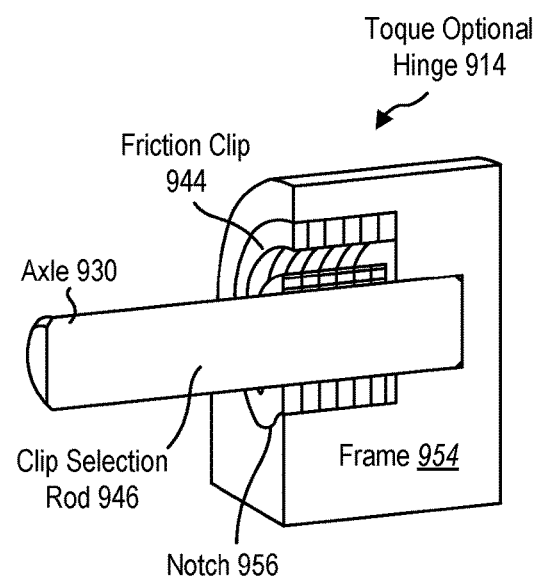
FIG. 15 is a partial cross-sectional perspective view of another torque-optional hinge, according to some embodiments of the present disclosure.

Referring now to FIG. 15, some embodiments of a torque-optional hinge 914 include a plurality of friction clips 944 that are selectively engaged by the axle 930. In some embodiments, the axle 930, therefore, operates both as the axle 930 of the torque-optional hinge 914 to support a third portion of an electronic device relative to a first portion and as a clip selection rod 946 that selectively engages with different numbers of friction clips 944 based on the position of the axle 930 relative to the frame 954. As the axle 930 slides longitudinally relative to the frame 954, the axle 930 selectively engages with different numbers of friction clips 944. In some embodiments, as the axle 930 rotates relative to the frame 954, the engaged friction clips 944 resists the rotation of the axle 930. The notch 956 of the friction clips 944 complementarily interlocks with the frame 954 to limit the rotation of the friction clips 944, engaged with the axle 930 or not, relative to the frame 954.

INDUSTRIAL APPLICABILITY

The present disclosure relates generally to systems and methods for supporting an electronic device. More particularly, the present disclosure relates to supporting a foldable electronic device in a plurality of postures and on a variety of surfaces. In some embodiments, the foldable device has a closed position and an open position. In conventional laptop devices, a display is supported in the open posture by the base portion of the laptop device. In some foldable electronic devices, the display is movable to a variety of positions relative to the base portion. In some embodiments, a hinge connects the base portion to the display cover portion. The hinge is a torque-optional hinge that provides resistance to rotation between the display cover and the base portion to support the display and/or display cover. In some embodiments, the hinge disengages a torque element of the hinge when the display is rotated about a second hinge of the display cover.

In some embodiments, a display of the electronic device is supported by a first portion of the electronic device and the base portion is a second portion of the electronic device. The first portion is connected to the second portion through a third portion of the electronic device. The third portion is intermediate to the first portion and the second portion. In some embodiments, the third portion is connected to the second portion by a torque-optional hinge and connected to the first portion by a support hinge. In some embodiments, when the support hinge in a closed state, the torque-optional hinge is engaged and provides rotational friction. In some embodiments, when the support hinge is in an open state (e.g., the first portion is rotated away from the third portion), the torque-optional hinge is disengaged and provides less or no rotational friction.

In some embodiments, the support hinge provides friction to support the first portion with the third portion and the combined friction of an engaged torque-optional hinge and the support hinge provides a large amount of resistance that is unpleasant for the user when adjusting the position of the first portion and/or display. Additionally, while the torque-optional hinge between the second portion and third portion supports the mass of the display and other electronic components when the support hinge is in a closed state, in some embodiments, when the support hinge is in an open state, the first portion and third portion form a support structure that supports the mass of the display and other electronic components of the first portion independently of the torque-optional hinge.

In some embodiments, a foldable electronic device according to the present disclosure has an open position and a closed position in which the first portion and third portion are adjacent one another and a support hinge is in a closed state. A third portion and a second portion of the electronic device are movable relative to one another around a torque-optional hinge. In some embodiments, the torque-optional hinge is a single-axis hinge. In other embodiments, the torque-optional hinge is a multiple-axis hinge. For example, the torque-optional hinge may have two or more parallel axes that each allow rotation of the first portion relative to the second portion.

The rotation of the first axis and the second axis may be independent of one another. In some examples, the rotation of the first axis and the second axis may be related. In some embodiments, the first axis and second axis rotate at the same rate, such that each axis is oriented at an equal angular position at point in the range of motion of the hinge. In some embodiments, the first axis and second axis rotate with determinate motion, allowing only one axis to move at a time.

In the closed position, an inner surface of the first portion and an inner surface of the second portion are oriented toward one another. For example, an electronic device with a display in the first portion and one or more input devices in the second portion has the display facing and adjacent to the input devices in the closed position. In some embodiments, the display is a touch-sensitive display. In some embodiments, the input device is a touch-sensitive display. In at least one example, a touch-sensitive display of the second portion and a touch-sensitive display of the first portion are facing and adjacent to one another in the closed position.

In some embodiments, the electronic device has a first display on an inner surface of the first portion and a second display on an inner surface of the second portion. In some embodiments, the electronic device in the open position orients the first portion and the second portion at 180° relative to one another and positions the first display and the second display co-planar to one another. In this position, the first display and second display may be in data communication (e.g., through a processor and/or graphics module) that allows the first display and second display to present visual information to a user as if the first display and second display are a single, unified display area.

In some embodiments, the electronic device has a plurality of postures that are made possible by the connection of the first portion to the second portion by two hinges on either end of an intermediate third portion of the electronic device. When the support hinge remains in a closed state, the torque-optional hinge between the second portion and the third portion allows the electronic device to operate similar to a conventional laptop moving between an open position and a closed position. When the support hinge is in an open state and the first portion and third portion are rotated away from one another, the electronic device enters a drafting position. In some embodiments, the support hinge has a range of motion (e.g., up to 180° that allows the first portion to invert on the third portion and the electronic device enters a tablet position.

In some embodiments, the drafting position of the electronic device includes moving the support hinge to a position between 0° and 180°. When the support hinge opens, the first portion rotates away from the third portion. In some embodiments, a lower edge of the first portion proximate the torque-optional hinge moves away from the torque-optional hinge and disengages the torque element of the torque-optional hinge. In some embodiments, after the support hinge opens, the first portion rotates away from the third portion, the hinge between the second portion and the third portion reduces in rotational resistance and/or provides no rotational resistance between the second portion and the third portion.

In some embodiments, the support hinge has a range of motion allowing the first portion to rotate up to 180° relative to the third portion. The first portion, therefore, may be parallel with the back surface of the third portion. In some embodiments, the third portion folds down to be parallel with the second portion, and the electronic device enters a tablet mode with the first portion oriented parallel with and stacked on top of the second portion. A display of the first portion is oriented away from the second portion in the tablet mode, allowing the user to view and/or interact with the display.

In some embodiments, the first and third portions are moved away from the second portion to provide clearance for the first portion to rotate around the support hinge relative to the third portion. When the support hinge returns to a closed state and the first portion and the third portion are contacting one another and parallel, the electronic device is in the open position. In some embodiments, the torque-optional hinge between the third portion and the second portion engages and a torque element of the torque-optional hinge provides rotational resistance around the hinge axis. From the open position, the electronic device can return to a closed position by rotating the first and third portions collectively relative to the second portion around the torque-optional hinge.

In some embodiments, the torque-optional hinge between the second portion (e.g., the base of the electronic device) and the third portion (e.g., the support that connects to and supports the first portion) has a high-torque state and a low-torque state. The high-torque state provides greater rotational resistance around a hinge axis of the torque-optional hinge than the low-torque state. In some embodiments, the low-torque state provides less than approximately 50% of the rotational resistance of the high-torque state. In some embodiments, the low-torque state provides less than approximately 25% of the rotational resistance of the high-torque state. In some embodiments, the low-torque state provides substantially no friction around the hinge axis.

In some embodiments, the high-torque state is an engaged state and the low-torque state is a disengaged state. In some embodiments, the torque-optional hinge receives a tab, pin, clip, clamp, post, or other engagement element from the first portion of the electronic device when a support hinge is in a closed state and the first portion and third portion are adjacent one another. For example, when the support hinge is in the closed state, a lower edge of the first portion is adjacent the torque-optional hinge, and an engagement element of the first portion engages with the torque-optional hinge, placing the torque-optional hinge in the high-torque state.

In some embodiments, when the first portion rotates around the support hinge and the lower edge moves away from the third portion and the torque-optional hinge, the engagement element of the first portion disengages from the torque-optional hinge and the torque-optional hinge enters the low-torque state. In some embodiments, the engagement element is a post or other protrusion from the first portion that engages with a recess or other opening in the torque-optional hinge. In some embodiments, the recess is located in a torque element, so that when the post engages with the recess, the post couples the rotation of the first portion and third portion around the hinge axis to the rotation of a torque element.

In some embodiments, the torque element generates a compression force in a radial direction around an axle of the hinge. In some embodiments, the torque element includes to axially adjacent elements that contact one another and generate a friction force as one element rotates relative to the other. In some embodiments, the torque element includes a fluid that provides resistance to the rotation of the torque element based on a viscosity of the fluid. In some embodiments, the torque element includes one or more magnets that resist rotation around the hinge axis via generation of eddy currents.

When the lower edge of the first portion rotates away from the torque-optional hinge, disengaging with the torque element, the torque-optional hinge enters into the low-torque state. In some embodiments, the low-torque state allows the third portion to rotate around the hinge axis with less or no rotational resistance.

In some embodiments, the support hinge rotationally connects the first portion to the third portion, and the torque generated by the support hinge supports the mass of the first portion at a drafting or viewing angle relative to the second portion. In some embodiments, the lower edge of the first portion rests on the second portion and the torque-optional hinge is connected to the second portion.

In some embodiments, when the first portion disconnects from the torque-optional hinge and the engagement elements disengage from torque-optional hinge, the third portion remains connected to the second portion via the torque-optional hinge. In some embodiments, the third portion remains connected to the second portion via an axle of the torque-optional hinge. In some embodiments, the third portion remains connected to the second portion via a flexible tether of the torque-optional hinge.

In some embodiments, the torque-optional hinge includes a frictional connection between the first portion and the second portion and a flexible connector between the third portion and the second portion. In some embodiments, the flexible connector is a polymer sheet or strap that is affixed to the second portion and the third portion. In some embodiments, the flexible connector is a fabric sheet or strap that is affixed to the second portion and the third portion. In some embodiments, the flexible connector is a leather sheet or strap that is affixed to the second portion and the third portion. In some embodiments, the flexible connector is a rubber sheet or strap that is affixed to the second portion and the third portion.

In some embodiments, a torque-optional hinge with a flexible connector between the third portion and the second portion includes a torque element that is selectively engaged by the first portion of the electronic device. In some embodiments, the torque is generated by a radial compression force between an axle and a clamp. In some embodiments, the axle is fixed relative to the second portion and the clamp is fixed relative to the first portion. In some embodiments, the clamp is fixed relative to the second portion and the axle is fixed relative to the first portion.

In some embodiments, when the first portion is parallel to and adjacent the third portion, the clamp engages the axle. The engaged clamp and axle create a friction force between the clamp and axle, functioning as the torque element when engaged. The flexible connector retains the third portion and second portion in alignment to facilitate the engagement of the torque element.

In some embodiments, the flexible connector and the torque element are a shared component, such that the flexible connector provides different amounts of torque depending on the tension in the flexible connector. A portion of the flexible connector is wrapped around a bar or axle of the torque-optional hinge. In some embodiments, the first portion of the electronic device selectively contacts the flexible connector. When contacted by the first portion, the flexible connector experiences more tension and produces more compression on the bar or axle. When the first portion moves away from the flexible connector, the tension in the flexible connector is reduced and the compression on the bar or axle is reduced.

In some embodiments, the torque-optional hinge provides different amounts of torque in different rotational directions. In some embodiments, the torque-optional hinge is independently changeable between a high-torque state and a low-torque state in each rotational direction. In some embodiments, a torque-optional hinge is in a high-torque state in an opening rotational direction while being in a low-torque state in a closing rotational direction. In some embodiments, a torque-optional hinge is in a low-torque state in an opening rotational direction while being in a high-torque state in a closing rotational direction. In some embodiments, a torque-optional hinge changes from a high-torque state to a low-torque state in an opening rotational direction while remaining in a low-torque state in a closing rotational direction.

In some embodiments, the torque-optional hinge includes a ratcheting mechanism that provides rotational resistance in a first rotational direction with the pawl engaged with the ratchet gear and less or no rotational resistance in the second rotational direction. When the pawl is disengaged from the ratchet gear, the ratchet and pawl provide less or no rotational resistance in either the first rotational direction or the second rotational direction.

In some embodiments, the torque-optional hinge includes a pair of ratcheting mechanisms oriented in opposing rotational directions. Because the ratcheting mechanisms are each unidirectional, opposing ratcheting mechanisms allow independent selection of high-torque and low-torque states in each of the rotational directions.

In some embodiments, the position of the pawl is controlled by the position of the first portion of the electronic device. In some embodiments, the lower edge or other part of the first portion contacts the pawl and urges the pawl toward the ratchet gear. In some embodiments, the pawl is moved toward the ratchet gear by a spring when the first portion is adjacent the third portion. In some embodiments, the pawl is moved by a pulley system connect to the support hinge, such that rotation of the support hinge translates to a cable pulling on the pawl. In some embodiments, the pawl is moved by an electromechanical actuator or motor that urges the pawl toward or away from the ratchet gear. In some embodiments, the position of the pawl is controlled by a software or operating system of the electronic device. The position of the pawl is independent of the orientation of the first portion relative to the third portion.

While some embodiments of a torque-optional hinge according to the present disclosure are binary with a low-torque mode and a high-torque mode, other embodiments have a plurality of modes and/or are continuously variable with a range of available torque values between a lowest-torque mode and a highest-torque mode. In some embodiments, the torque-optional hinge has a low-torque mode and a high-torque mode that are relative to one another.

In some embodiments, the torque element of the torque-optional hinge includes a plurality of friction clips that each provide a torque to the axle of the torque-optional hinge. The friction clips engage a surface of the axle and apply a compressive force and associated friction thereto. When a friction clip is also engaged with a clip selection rod, the rotation of the friction clip relative to the hinge axis is limited and/or prevented and the friction with the axle resists movement of the axle relative to the frame, as well.

In some embodiments, when a friction clip is engaged with a clip selection rod, the rotation of the axle around the hinge axis is, thereby, resisted by the friction due to the engaged friction clip(s) contacting the axle. Conversely, a friction clip that is not engaged with the clip selection rod is free to rotate relative to a frame of the torque-optional hinge, resulting in a rotational resistance (torque) of the torque-optional hinge that is relative to the number of friction clips that are both contacting the axle and engaged with the clip selection rod. In some embodiments, a torque-optional hinge with all friction clips engaged with the clip selection rod experiences a highest-torque mode. In some embodiments, a torque-optional hinge with no friction clips engaged with the clip selection rod experiences a highest-torque mode. In some embodiments, the clip selection rod remains engaged with at least one friction clip in the lowest-torque mode. In some embodiments, additional torque values are selectable between the highest-torque mode and the lowest-torque mode.

A torque-optional hinge with a plurality of friction clips, in some embodiments, have spacers or washers positioned between at least some of the friction clips along the axle to ensure that each friction clip is engaged individually Immediately adjacent and/or contacting friction clips may impart additional and unintended friction or resistance to rotation upon one another. For example, a last friction clip that is engaged by the clip selection rod may, when no spacer is present therebetween, unintentionally contact and limit the rotation of an adjacent friction clip that is not engaged by the clip selection rod, altering the effected torque from that which is selected by a user.

In some embodiments, the clip selection rod is moveable relative to the frame and friction clips by a user manually inserting or retracting the clip selection rod relative to the frame, such as by rotating a threaded clip selection rod. In some embodiments, the clip selection rod is moveable relative to the frame and friction clips by an electric motor inserting or retracting the clip selection rod relative to the frame. In some embodiments, the clip selection rod is moveable relative to the frame and friction clips by a software controlled electric motor inserting or retracting the clip selection rod relative to the frame, such as an operating system of an electronic device. The torque generated by the torque-optional hinge, therefore, can be adjusted by the user or by the electronic device itself based on a range of considerations.

In some embodiments, the friction clip has a body from which a plurality of arms protrudes. In some embodiments, the arms are elastically deformable to bend when an axle is inserted between the arms. The arms apply a compression force to the axle and an associated friction. When the friction clip is rotated relative to the axle positioned between the arms, the friction applied to the axle surface resists the relative motion of the axle and the friction clip.

In some embodiments, a friction clip has a tail that protrudes from the body in addition to the arms. In some embodiments, the tail has a V-shape to engage with a rail or rod. In some embodiments, the tail has a V-shape to engage with a rail or rod oriented perpendicularly to the direction of the tail. In some embodiments, the tail includes a single protrusion from the body that engages with a notch or other recess in a rail or rod.

A torque-optional hinge may have a plurality of friction clips that are connected to and engaged with an axle of the torque-optional hinge. The friction clips each have a tail engages with a clip selection rod that, depending upon the position of the clip selection rod, allows for the selective engagement with any number of the friction clips. The clip selection rod is movable relative to a frame to anchor the tail of an engaged friction clip relative to the frame and limit rotation of the friction clip as the axle rotates relative to the frame.

In some embodiments, a friction clip has a body from which a plurality of arms protrudes. In some embodiments, the arms are elastically deformable to bend when an axle is inserted between the arms. The arms apply a compression force to the axle and an associated friction. When the friction clip is rotated relative to the axle positioned between the arms, the friction applied to the axle surface resists the relative motion of the axle and the friction clip.

In some embodiments, a friction clip has a notch formed in an outer perimeter of the body in addition to the arms. In some embodiments, the notch engages with a protrusion of the frame of the torque-optional hinge to anchor the rotational position of the friction clip relative to the frame.

Some embodiments of a torque-optional hinge include a plurality of friction clips that are selectively engaged by the axle. In some embodiments, the axle, therefore, operates both as the axle of the torque-optional hinge to support a third portion of an electronic device relative to a first portion and as a clip selection rod that selectively engages with different numbers of friction clips based on the position of the axle relative to the frame. As the axle slides longitudinally relative to the frame, the axle selectively engages with different numbers of friction clips. In some embodiments, as the axle rotates relative to the frame, the engaged friction clips resists the rotation of the axle. The notch of the friction clips complementarily interlocks with the frame to limit the rotation of the friction clips, engaged with the axle or not, relative to the frame.

The present disclosure relates to systems and methods for supporting an electronic device on a surface according to at least the examples provided in the sections below:

1. An electronic device comprising:
    a first portion;
    a second portion;
    a third portion;
    a torque-optional hinge that movably connects the third portion to the second portion, the torque-optional hinge having a hinge axis and a means for selectively generating a torque configured to selectively generate a torque around the hinge axis, wherein the torque-optional hinge has a high-torque state and a low-torque state, the high-torque state providing a greater rotational resistance around the hinge axis than the low-torque state; and
    a support hinge positioned between the first portion and the third portion, the support hinge rotatably connecting the first portion and the third portion and providing a torque around a support axis.
2. The electronic device of section 1, wherein the torque-optional hinge includes a frictional torque element.
3. The electronic device of any preceding section, wherein the low-torque state provides no rotational resistance.
4. The electronic device of any preceding section, wherein the torque-optional hinge includes a flexible connector.
5. The electronic device of section 4, wherein the flexible connector includes a fabric.
6. The electronic device of section 1, wherein the means for selectively generating the torque includes selecting a quantity of friction clips generating torque on an axle positioned at the hinge axis.
7. The electronic device of any preceding section, wherein the means for selectively generating the torque provides different torque in a first rotational direction and a second rotational direction.
8. The electronic device of section 7, wherein the high-torque state and low-torque state are independent of one another in the first rotational direction and the second rotational direction.
9. The electronic device of any preceding section, wherein the support hinge has an open state and a closed state, and wherein the torque-optional hinge is in the high-torque state when the support hinge is in the closed state and the torque-optional hinge is in the low-torque state when the support hinge is in the open state.
10. The electronic device of any preceding section, wherein the torque-optional hinge includes a ratcheting mechanism that allows resists rotation in first rotational direction when engaged.
11. The electronic device of any preceding section, wherein the torque-optional hinge includes a pair of opposing ratcheting mechanisms that resist rotation around the hinge axis when engaged.
12. The electronic device of any preceding section, wherein the means for selectively generating the torque includes an axle and a clamp that applies a radial compression to the axle to generate friction with the axle.
13. The electronic device of section 12, wherein the one of the axle and the clamp is fixed relative to the first portion and the other of the axle and the clamp is fixed relative to the third portion, the means for selectively generating the torque generating friction when the support hinge is in a closed state.
14. The electronic device of any preceding section, wherein the support hinge has a range of motion up to 180°.
15. An electronic device comprising:
    a first portion;
    a second portion;
    a third portion;
    a torque-optional hinge that movably connects the third portion to the second portion, the torque-optional hinge having a hinge axis and a torque element with a ratcheting mechanism configured to selectively generate a torque around the hinge axis, wherein the torque-optional hinge has a high-torque state and a low-torque state, the high-torque state providing a rotational resistance around the hinge axis and the low-torque state allowing rotation around the hinge axis without additional rotational resistance; and
    a support hinge positioned between the first portion and the third portion, the support hinge rotatably connecting the first portion and the third portion and providing a torque around a support axis.
16. The electronic device of section 15, wherein the ratcheting mechanism is a first ratcheting mechanism that provides torque in the high-torque state around the hinge axis in a first rotational direction, and the torque element further comprises a second ratcheting mechanism and the second ratcheting mechanism provides torque in the high-torque state around the hinge axis in a second rotational direction.

17. The electronic device of sections 15 or 16, wherein a pawl of the ratcheting mechanism is engaged and disengaged with a ratchet gear of the ratcheting mechanism by an electromagnetic actuator.

18. The electronic device of section 17, wherein the electromagnetic actuator is controlled by software of the electronic device.

19. An electronic device comprising:
a first portion including a display;
a second portion including an input device;
a third portion connecting the first portion to the second portion;
a torque-optional hinge that movably connects the third portion to the second portion, the torque-optional hinge having a hinge axis and a torque element configured to selectively generate a torque around the hinge axis, wherein the torque-optional hinge has a high-torque state and a low-torque state, the high-torque state providing a greater rotational resistance around the hinge axis than the low-torque state; and
a support hinge positioned between the first portion and the third portion, the support hinge rotatably connecting the first portion and the third portion and providing a torque around a support axis, wherein the support hinge has an open state and a closed state, and wherein the torque-optional hinge is in the high-torque state when the support hinge is in the closed state and the torque-optional hinge is in the low-torque state when the support hinge is in the open state.

20. The electronic device of section 19, wherein the display is a first touch-sensitive display and the input device is a second touch-sensitive display.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic device comprising:
a first portion;
a second portion;
a third portion;
a torque-optional hinge that movably connects the third portion to the second portion, the torque-optional hinge having a hinge axis and a means for selectively generating a torque around the hinge axis by a radial compression force applied to the hinge axis, wherein the means for selectively generating the torque has a high-torque state and a low-torque state, the high-torque state providing a greater rotational resistance around the hinge axis than the low-torque state; and
a support hinge positioned between the first portion and the third portion, the support hinge rotatably connecting the first portion and the third portion and providing a torque around a support axis, wherein the support hinge is connected to the first portion away from a lower edge of the first portion, allowing the lower edge to move away from the third portion.

2. The electronic device of claim 1, wherein the means for selectively generating the torque includes a frictional torque element.

3. The electronic device of claim 1, wherein the low-torque state provides no rotational resistance.

4. The electronic device of claim 1, wherein the means for selectively generating the torque includes a flexible connector.

5. The electronic device of claim 4, wherein the flexible connector includes a fabric.

6. The electronic device of claim 1, wherein the means for selectively generating the torque includes selecting a quantity of friction clips generating torque on an axle positioned at the hinge axis.

7. The electronic device of claim 1, wherein the means for selectively generating the torque provides different torque in a first rotational direction and a second rotational direction.

8. The electronic device of claim 7, wherein the high-torque state and low-torque state are independent of one another in the first rotational direction and the second rotational direction.

9. The electronic device of claim 1, wherein the support hinge has an open state and a closed state, and wherein the torque-optional hinge is in the high-torque state when the support hinge is in the closed state and the torque-optional hinge is in the low-torque state when the support hinge is in the open state.

10. The electronic device of claim 1, wherein the torque-optional hinge includes a ratcheting mechanism that allows resists rotation in first rotational direction when engaged.

11. The electronic device of claim 1, wherein the torque-optional hinge includes a pair of opposing ratcheting mechanisms that resist rotation around the hinge axis when engaged.

12. The electronic device of claim 1, wherein the means for selectively generating the torque includes an axle and a clamp that applies a radial compression to the axle to generate friction with the axle.

13. The electronic device of claim 12, wherein the one of the axle and the clamp is fixed relative to the first portion and the other of the axle and the clamp is fixed relative to the third portion, the means for selectively generating the torque generating friction when the support hinge is in a closed state.

14. The electronic device of claim 1, wherein the support hinge has a range of motion up to 180°.

15. An electronic device comprising:
a first portion;
a second portion;
a third portion;
a torque-optional hinge that movably connects the third portion to the second portion, the torque-optional hinge having a hinge axis and a torque element with a ratcheting mechanism configured to selectively generate a torque around the hinge axis by a radial compression force applied to the hinge axis, wherein the torque-optional hinge has a high-torque state and a low-torque state, the high-torque state providing a rotational resistance around the hinge axis and the low-torque state allowing rotation around the hinge axis without additional rotational resistance; and
a support hinge positioned between the first portion and the third portion, the support hinge rotatably connecting the first portion and the third portion and providing a torque around a support axis, wherein the support hinge is connected to the first portion away from a lower edge of the first portion, allowing the lower edge to move away from the third portion.

16. The electronic device of claim 15, wherein the ratcheting mechanism is a first ratcheting mechanism that provides torque in the high-torque state around the hinge axis in a first rotational direction, and
the torque element further comprises a second ratcheting mechanism and the second ratcheting mechanism provides torque in the high-torque state around the hinge axis in a second rotational direction.

17. The electronic device of claim 15, wherein a pawl of the ratcheting mechanism is engaged and disengaged with a ratchet gear of the ratcheting mechanism by an electromagnetic actuator.

18. The electronic device of claim 15, further comprising an electromagnetic actuator controlled by software of the electronic device.

19. An electronic device comprising:
a first portion including a display;
a second portion including an input device;
a third portion connecting the first portion to the second portion;
a torque-optional hinge that movably connects the third portion to the second portion, the torque-optional hinge having a hinge axis and a torque element configured to selectively generate a torque around the hinge axis by a radial compression force applied to the hinge axis, wherein the torque-optional hinge has a high-torque state and a low-torque state, the high-torque state providing a greater rotational resistance around the hinge axis than the low-torque state; and
a support hinge positioned between the first portion and the third portion, the support hinge rotatably connecting the first portion and the third portion and providing a torque around a support axis, wherein the support hinge has an open state and a closed state, and wherein the torque-optional hinge is in the high-torque state when the support hinge is in the closed state and the torque-optional hinge is in the low-torque state when the support hinge is in the open state, wherein the support hinge is connected to the first portion away from a lower edge of the first portion, allowing the lower edge to move away from the third portion.

20. The electronic device of claim 19, wherein the display is a first touch-sensitive display and the input device is a second touch-sensitive display.

* * * * *